March 24, 1942. J. C. TRAVILLA, JR., ET AL 2,277,617
RAILWAY VEHICLE
Filed Feb. 26, 1940
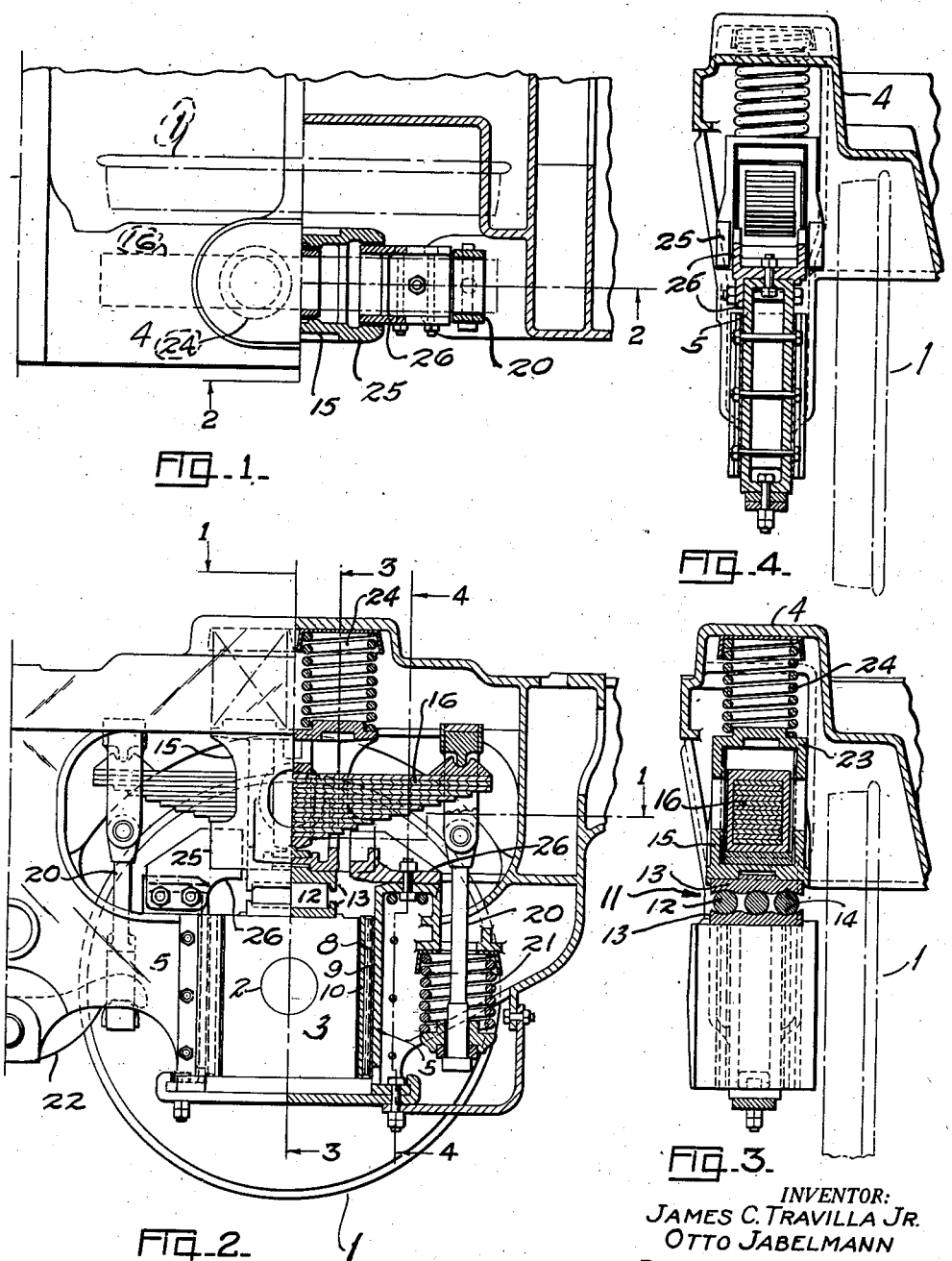
INVENTOR:
JAMES C. TRAVILLA JR.
OTTO JABELMANN
BY Rodney Bedell
ATTORNEY Patented Mar. 24, 1942

2,277,617

UNITED STATES PATENT OFFICE 2,277,617

RAILWAY VEHICLE

James C. Travilla, Jr., University City, Mo., and Otto Jabelmann, Omaha, Nebr.; said Travilla assignor to General Steel Castings Corporation, Granite City, Ill., a corporation of Delaware Application February 26, 1940, Serial No. 320,772

6 Claims. (Cl. 105—222)

The invention relates to railway rolling stock and more particularly to a spring support for the framing structure of the vehicle.

A familiar type of spring support for railway vehicle framing structure, such as used with a main frame or underframe or a truck frame, comprises an equalized spring system including a plurality of semi-elliptic springs supported by the axle boxes with equalizers between and connected to adjacent springs on the same side of the vehicle or truck and pivoted intermediate their ends to the main frame or truck frame, as the case may be. Spring systems of this kind provide an effective means to distribute loads to the axles, but they have some objectionable features in the event of a broken spring and in the event of a big difference between the light and loaded weights of the vehicle, such as with locomotive tenders wherein the capacity water and fuel load of the tender may be nearly two times the weight of the tender itself with constantly changing loads due to water and fuel consumption.

In the event of a broken spring on structures with outside bearings, the load is removed from the journal box and the load on the box at the opposite side tends to lift the wheel on the side with the broken spring. This is objectionable from the standpoint of safety.

Where there is a big difference between the light and loaded weights of the vehicle, such as in locomotive tenders, the semi-elliptic springs do not give as much flexibility under light load as under full load and this is objectionable because it gives harder riding qualities under light load. Consequently it is more difficult to design the springs for this type of vehicle so that maximum safety and satisfactory riding conditions are obtained, together with a minimum amount of track and vehicle maintenance or repair work, than for vehicles where there is little variation between the light load and the full load.

To overcome some of the objectionable features of such spring supports used especially on vehicles having much variation between the light load and full load, the present invention contemplates the use of a dual spring system comprising semi-elliptic springs and coil springs. The coil springs are mounted independently of the semi-elliptic springs but co-act therewith to support the vehicle frame on the boxes and to hold the wheels on the rail in case of broken semi-elliptic springs.

The main object of the invention is to provide a spring support which will give safe riding conditions and which will improve the riding qualities of a railway vehicle.

Another important object is to provide a resilient spring support which will give good riding qualities when the vehicle is under light load or empty.

Another object is to facilitate assembly and disassembly of the spring supports and the vehicle frame.

Another object is to provide a spring support which gives safe riding conditions with minimum track and vehicle maintenance conditions but which at the same time permits relative lateral motion of the axles and journal boxes with respect to the truck frame.

These objects are attained by the structure illustrated in the accompanying drawing in which—

Figure 1 is a plan view of a part of a railway tender frame and its supporting structure embodying this invention, portions of the frame being shown in section along the line 1—1 of Figure 2.

Figure 2 is a side elevation and vertical longitudinal section on the line 2—2 of Figure 1.

Figures 3 and 4 are vertical transverse sections on the lines 3—3 and 4—4 respectively of Figure 2.

A series of wheels 1 mount axles 2, each journalled in a box 3 in the usual manner. The tender frame includes side members 4 having inner and outer vertical walls, there being pedestal structure formed integral therewith and including spaced legs 5 slidably receiving box 3 between them.

A lateral motion device as described in Travilla application, Serial No. 235,142, filed October 15, 1938, now Patent No. 2,229,429, granted January 21, 1941, is positioned between axle box 3 and the pedestal structure to permit relative transverse movement of the frame and running gear. This device comprises a rubber pad 8 with a metal plate 9 bonded to one of its faces and a metal plate 10 bonded to its other face. Plate 9 is secured to the pedestal leg, and plate 10 slidably opposes the adjacent box wall and its edges oppose the front and rear flanges on the box wall.

A lateral motion bearing 11 is supported on axle box 3 and comprises a plurality of rollers 12 and a pair of seat members 13 with grooves 14 to keep rollers 12 spaced properly and to provide a resistance and centering means between the axle box and frame to assist the lateral motion device in resisting and absorbing lateral shocks and to center box 3 in the pedestal when such forces have been dissipated. Supported by the lateral motion bearing is a saddle 15 carrying a semi-elliptic spring 16 from the ends of which depend links 20. As shown in Figure 2, one of the links 20 is connected through a coil spring 21 to the frame, and the other link 20 is connected to equalizer 22 pivoted to the truck frame. These parts comprise one end of a continuous equalizing system extending throughout a substantial portion of the length of the tender and terminating at its other end in an anchorage to the frame corresponding to that shown at the right hand end of Figure 2.

The upper portion of the saddle has a plurality of seats 23 to accommodate coil springs 24 positioned between the saddle and the frame. The semielliptic springs 16 carry a greater percentage of the load than do coil springs 24 when the car or tender is loaded, but the proportion of load on the coil springs with respect to the load on the semielliptic springs will be considerably higher when the tender is empty because the coil springs are much more flexible than the semielliptic springs. By placing coil springs 24 on the saddle above axle box 3, equalization of the semielliptic springs and equalizers will not be hampered even though the load carried by the coil springs is not equalized, since this latter load is only a relatively small part of the maximum combined spring load.

The lower portion of saddle 15 has laterally spaced jaws 25 on each side to engage separate guide brackets 26 fastened to the top portions of the pedestal structure to prevent lateral displacement of the saddle relative to the pedestal but permitting relative vertical movement of the saddle and pedestal structure. Separate guide brackets 26 permit the application or removal of the springs and saddle laterally of the frame, and the brackets are applied after these parts have been inserted through the large openings above the pedestal structure. The coil springs are inserted before the saddle and semi-elliptic spring is applied. When disassembling the parts, the guide brackets are removed first. If lateral movement is not provided between the box and pedestal, the guide brackets and lateral motion bearing between the box and saddle may be omitted.

As stated above, the semi-elliptic springs form a part of a spring equalizing system which supports the frame on the journal boxes. In case a semi-elliptic spring breaks, the coil springs act to hold the adjacent wheel on the track. Also, the coil springs provide for more spring capacity. A tender provided with a spring structure as described herein will ride smoothly whether the car is loaded completely or is empty, since a greater percentage of the load is carried by the semi-elliptic springs when the car is loaded than when the car is light.

The above description and the accompanying drawing disclose one embodiment of the invention which is to be understood as illustrative and not as inclusive of construction comprising the invention. For example, in place of the lateral motion bearing 11 there could be substituted other types of lateral motion bearings such as utilizing rubber blocks, sliding plates, rockers, etc. While the invention is shown and described as being applied to a vehicle underframe, it is also adapted for use in trucks forming separate units upon which the ordinary vehicle underframe is carried. The details may be otherwise modified without departing from the spirit of the invention and the exclusive use of such modifications as come within the scope of the claims is contemplated.

What is claimed is:

1. In a railway vehicle, an axle box, a frame including a pedestal receiving said axle box, a bracket on said pedestal, a spring saddle, a lateral motion device mounting said saddle on said axle box, a leaf spring carried by said saddle and supporting said frame, a coil spring carried by said saddle and housed in and supporting said frame, said bracket being removably fastened to said pedestal so that said springs and saddle may be removed laterally from said frame.

2. In a railway vehicle, wheeled axles, axle boxes, leaf springs carried on the tops of said boxes and extending therefrom longitudinally of the vehicle, a frame, equalizers pivoted to said frame and connected at their ends to said springs whereby said frame is supported by said springs and the action of the latter is equalized, and coil springs supported from said axle boxes independently of said leaf springs and above the latter and each directly supporting said frame.

3. In a railway vehicle, wheeled axles, axle boxes, leaf springs supported intermediate their ends from said boxes and extending therefrom longitudinally of the vehicle, a frame, levers pivoted to said frame and connected at their ends to the end portions of said springs whereby said frame is supported from said springs and the action of the latter is equalized, and coil springs supported from said boxes above the intermediate portions of said leaf springs and directly supporting said frame, the construction and arrangement of said springs and their connections to the box and frame providing for their compression and expansion independently of each other and for the vertical tilting of said leaf springs independently of said coil springs.

4. In a railway vehicle, wheeled axles, axle boxes, saddle members mounted on said axle boxes and each including vertically spaced spring seats one above the other, leaf springs extending longitudinally of the frame beyond said saddles and having their middle portions mounted on the lower of said seats, a frame, levers pivoted to said frame and connected at their ends to the end portions of said leaf springs, whereby said frame is supported by said springs and the action of the latter is equalized, vertically disposed coil springs mounted on the upper of said seats and directly supporting said frame, said upper seats clearing said leaf springs whereby said leaf springs and coil springs may compress and expand independently of each other.

5. In a railway vehicle, a wheeled axle, an axle box, a frame including a pedestal jaw receiving said box, a saddle above said box and mounted thereon to move transversely of the box, a spring carried by said saddle and supporting said frame, said saddle and spring being movable laterally of the frame into assembled relation with the same and the box, and guide elements on said frame opposing said saddle and limiting relative lateral movement of said saddle and frame while permitting their relative vertical movement.

6. In a railway vehicle, a wheeled axle, an axle box, a frame including a pedestal jaw receiving said box, a saddle above said box and mounted thereon to move transversely of the box, a leaf spring carried by said saddle and extending longitudinally of the frame beyond said saddle, links suspended from the ends of said spring and supporting said frame, and cooperating guide elements on said frame and saddle clearing said spring and links transversely of the frame and limiting relative lateral movement of said saddle and frame while permitting their relative vertical movement, the guide elements on the frame being detachably secured thereto to accommodate the application and removal laterally of the frame of the saddle and spring to the frame and axle box.

JAMES C. TRAVILLA, JR.
OTTO JABELMANN.